(12) United States Patent
Klein

(10) Patent No.: US 10,996,041 B2
(45) Date of Patent: May 4, 2021

(54) DEVICES AND METHODS FOR FACILITATING BLAST AND DISPERSION MITIGATION

(71) Applicant: Sanmina Corporation, San Jose, CA (US)

(72) Inventor: Max Edward Klein, Huntsville, AL (US)

(73) Assignee: SANMINA CORPORATION, San Jose, CA (US)

(*) Notice: Subject to any disclaimer, the term of this patent is extended or adjusted under 35 U.S.C. 154(b) by 0 days.

(21) Appl. No.: 16/845,950

(22) Filed: Apr. 10, 2020

(65) Prior Publication Data
US 2020/0386529 A1 Dec. 10, 2020

Related U.S. Application Data

(63) Continuation of application No. 15/887,769, filed on Feb. 2, 2018, now Pat. No. 10,619,988.
(Continued)

(51) Int. Cl.
F42D 5/045 (2006.01)
B64C 39/02 (2006.01)
(Continued)

(52) U.S. Cl.
CPC ............ *F42D 5/045* (2013.01); *B64C 39/024* (2013.01); *B64D 1/02* (2013.01); *F41H 11/02* (2013.01); *F41H 13/0006* (2013.01); *B64C 2201/027* (2013.01); *B64C 2201/108* (2013.01); *B64C 2201/12* (2013.01)

(58) Field of Classification Search
CPC .......... B64C 2201/182; B64C 2201/12; B64C 2201/121; B64C 39/024; F42D 5/045; B64D 1/02; F41H 13/0006
See application file for complete search history.

(56) References Cited

U.S. PATENT DOCUMENTS 6,854,374 B1 2/2005 Breazeale
9,085,362 B1 7/2015 Kilian et al.
(Continued)

FOREIGN PATENT DOCUMENTS

EP 2409111 B1 11/2016
RU 2490584 C1 8/2013
RU 2565863 C2 10/2015

OTHER PUBLICATIONS

PCT/US2018/016762. International Search Report & Written Opinion (dated Jun. 14, 2018).

Primary Examiner — Benjamin P Lee
(74) Attorney, Agent, or Firm — Loza & Loza, LLP; Tyler J. Barrett

(57) ABSTRACT

Containment vessels are adapted to facilitate blast and dispersion mitigation. According to one example, a containment vessel may include at least one containment layer. At least one expansion member may be coupled to the at least one containment layer to apply a force sufficient to expand a perimeter of the containment layer(s) laterally outward. A closure system may be coupled with the containment layer(s), where the closure system is configured to cinch the perimeter of the containment layer(s) around a target object without manual intervention. Unmanned aerial vehicle (UAV) including a containment vessel, as well as methods of making a containment vessel are also disclosed. Other aspects, embodiments, and features are also included.

11 Claims, 7 Drawing Sheets

Related U.S. Application Data

(60) Provisional application No. 62/454,630, filed on Feb. 3, 2017.

(51) Int. Cl.
*B64D 1/02* (2006.01)
*F41H 13/00* (2006.01)
*F41H 11/02* (2006.01)

(56) References Cited

U.S. PATENT DOCUMENTS

| | | |
|---|---|---|
| 10,005,556 B2 | 6/2018 | Rastgaar et al. |
| 10,155,587 B1 | 12/2018 | Tang |
| 2016/0376029 A1 | 12/2016 | Sekiya |
| 2017/0253348 A1 | 9/2017 | Ashdown et al. |
| 2017/0356726 A1 | 12/2017 | Theiss et al. |
| 2018/0162529 A1 | 6/2018 | Klein |
| 2018/0257780 A1 | 9/2018 | Sassinsky |
| 2018/0283828 A1 | 10/2018 | Teetzel et al. |

DEVICES AND METHODS FOR FACILITATING BLAST AND DISPERSION MITIGATION

PRIORITY CLAIM

The present Application for Patent is a continuation of U.S. patent application Ser. No. 15/887,769 entitled "Devices and Methods for Facilitating Blast and Dispersion Mitigation" filed Feb. 2, 2018, which claims priority to Provisional Application No. 62/454,630 entitled "Devices and Methods for Facilitating Blast and Dispersion Mitigation" filed Feb. 3, 2017, the entire disclosures of each of which are hereby expressly incorporated by reference herein.

TECHNICAL FIELD

The technology discussed below relates generally to unmanned aerial vehicles (UAVs), and more specifically to methods and devices for mitigation of explosive, chemical, biological, and/or other threats from a captured UAV.

BACKGROUND

A recent area of concern is the increasing use of unmanned aerial vehicles (UAVs) by hostile adversaries. Common UAVs small enough to be portable (i.e. human-portable) are often referred to as drones. Such UAVs can be assembled from commercially off-the-shelf materials, or purchased in a ready-to-use state. A typical UAV can carry a relatively significant payload. Electric motors may provide UAVs with relative acoustic stealth. Commercially available miniature flight control computers and sensors provide such UAVs with some degree of autonomy, mitigating the need for line of sight operation.

It is anticipated that inexpensive UAVs may be used by adversaries not only for intelligence, surveillance, and reconnaissance (ISR), but also as weapon delivery platforms that may carry explosive, chemical, radiological, and/or biological payloads. Attempting to destroy UAVs carrying such payloads makes possible inadvertent abetting of an adversary's mission. That is, conventional attempts to destroy a UAV may not neutralize the payload, but may actually assist in dispersing explosive, chemical, radiological, or biological agents over an area. For example, shooting down a UAV could trigger dispersal of the chemical or biological agent onboard. Thus, systems that can reduce or even eliminate the dispersion of dangerous materials are generally desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate blast and dispersion mitigation. According to at least one aspect of the disclosure, blast and dispersion mitigation devices may include at least one containment layer. At least one expansion member may be coupled to the at least one containment layer. The at least one expansion member may be configured to apply a force to the at least one containment layer sufficient to expand a perimeter of the at least one containment layer laterally outward when deployed. A closure system may be included, where the closure system is configured to cinch the perimeter of the at least one containment layer around a target object without manual intervention.

Additional aspects of the disclosure include unmanned aerial vehicles (UAVs). One or more embodiments of a UAV may include an airframe and a propulsion system coupled to the airframe. A netting system may be coupled to the airframe, where the netting system is configured to launch a net toward a target. A containment vessel may be coupled to the airframe. The containment vessel may include at least one containment layer selected from a group of containment layers comprising a blast layer, a non-porous layer, and a conductive layer.

Still further aspects of the disclosure include methods of making a blast and dispersion mitigation device. According to one or more implementations, such methods may include forming at least one containment layer. At least one expansion member may be coupled to the at least one containment layer, where the at least one expansion member applies a force sufficient to expand a perimeter of the at least one containment layer laterally outward when deployed. A closure system may be coupled to the at least one containment layer to cinch the perimeter of the at least one containment layer when activated.

Other aspects, features, and embodiments associated with the present disclosure will become apparent to those of ordinary skill in the art upon reviewing the following description in conjunction with the accompanying figures.

DRAWINGS

FIG. 4A is shows the containment vessel in various stages of deployment, and FIG. 4B shows the containment vessel draped over the target UAV prior to being fully enclosed.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular containment vessel or UAV, but are merely idealized representations which are employed to describe the present disclosure. Additionally, elements common between figures may retain the same numerical designation.

Figure 1:
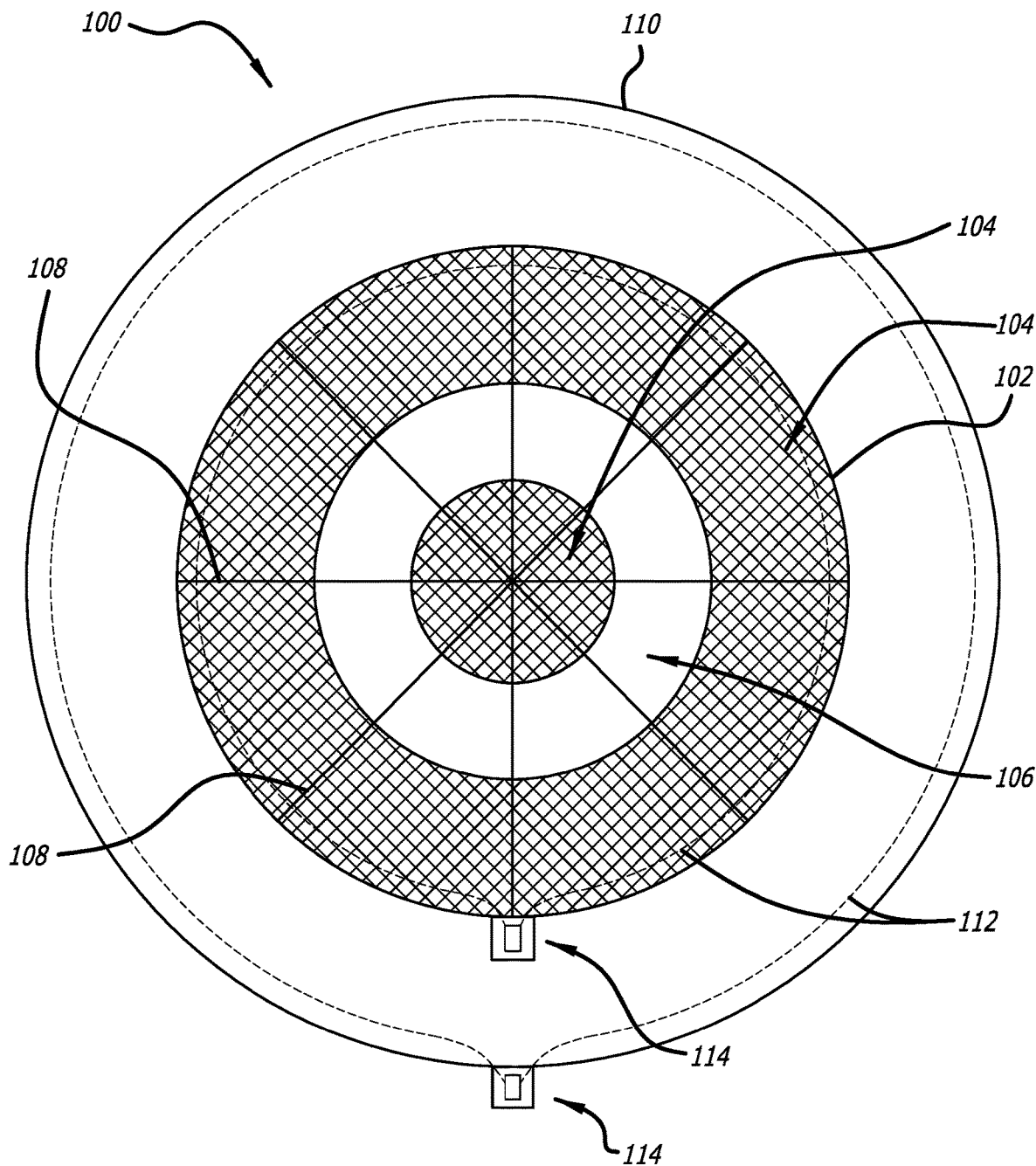
FIG. 1 is a top view of a containment vessel in an open configuration according to at least one implementation.
Figure 2:
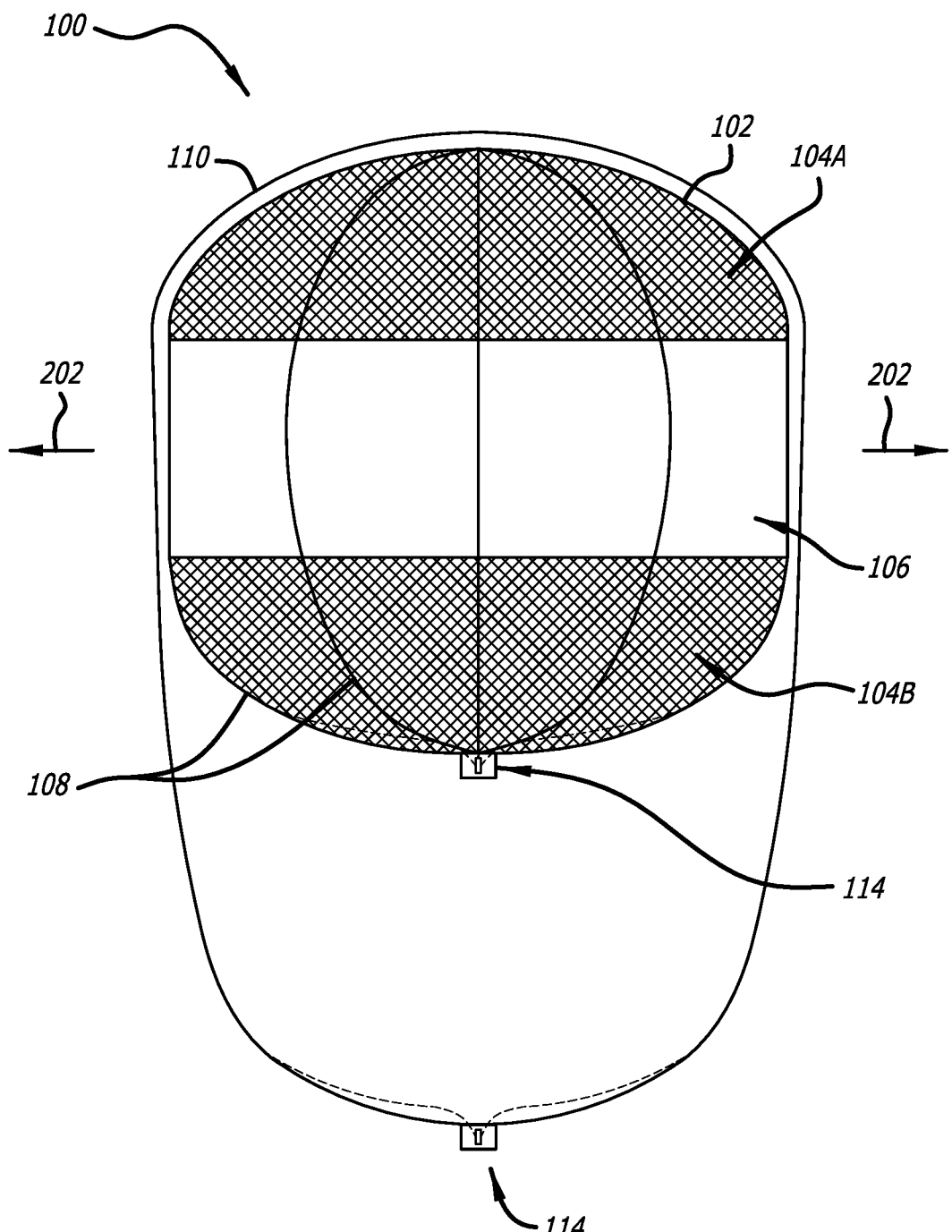
FIG. 2 is a side view of the containment vessel of FIG. 1 in a containment configuration to enclose a device therein.

Various embodiments of the present disclosure include containment vessels that are configured to mitigate blasts and dispersion of one or more materials. Such containment vessels may also be referred to as a blast and dispersion mitigation device. FIG. 1 illustrates a top view of a containment vessel 100 in an open configuration according to at least one implementation, and FIG. 2 illustrates a side view of the containment vessel 100 in a containment configuration for enclosing a device therein according to at least one example. Referring to FIG. 1 and FIG. 2, the containment vessel 100 generally includes one or more containment layers (e.g., layers 102 and 106) coupled with at least one expansion member and with a closure system.

The one or more containment layers can be sized and shaped to be placed around a device in a manner to at least substantially enclose the device within the containment vessel 100. Each containment layer of the containment vessel 100 is designed to address one or more specific threats. By way of example and not limitation, the containment vessel 100 may include a containment layer configured as a blast layer, a non-porous layer, a conductive layer, and/or other containment layer(s).

An example of a containment vessel 100 including a containment layer configured as a blast layer 102 is shown in FIGS. 1 and 2. Generally, the blast layer 102 can include one or more portions of blast material 104 depicted by the shaded sections of the containment vessel 100, with one or more exhaust gaps or exhaust sections 106. In the example shown in FIGS. 1 and 2, the blast layer 102 includes an upper portion of blast material 104A and a lower portion of blast material 104B as oriented in FIG. 2, separated by the exhaust section 106 that facilitates the escape of energy may be created by an explosion that may occur inside of the containment vessel 100 when a device is captured therein. Generally, the blast material 104 of the blast layer 102 can be located to provide protection from shrapnel and projectiles in one or more specific directions, while the exhaust section 106 directs the blast in one or more other specific directions that are determined to be less dangerous. In the example depicted in FIG. 2, the energy from an explosion from a device enclosed by the containment vessel 100 will be directed laterally outward through the exhaust section 106 in the direction of arrows 202, while the blast material 104 protects objects and/or persons that are located above and below the containment vessel 100 from the blast.

Although the example in FIGS. 1 and 2 shows a specific configuration with the exhaust section 106 positioned between the upper portion and lower portion of blast material 104, it will be apparent that the specific size, shape, and location of the blast material portions and exhaust sections may vary according to a number of design choices, such as the direction(s) in which it is desired to direct the blast energy and the direction(s) in which it is desired to protect objects and/or persons from shrapnel and projectiles launched by an explosion within the containment vessel 100. For example, in another embodiment the blast material 104 may be positioned to include all of the lower portion 104B, the exhaust section 106 and part of the upper portion 104A, while leaving an exhaust section at the top to direct a blast upward, while inhibiting the shrapnel and projectiles from traveling downward or laterally outward. Such an example may be useful in protecting people or objects that are located laterally from a captured device.

The blast material 104 of the blast layer 102 may be formed from a material that is capable of stopping relatively high velocity projectiles that may result from an explosion within the containment vessel 100. By way of example and not limitation, the blast material 104 of the blast layer 102 may be formed from a woven para-aramid synthetic fiber (e.g., KEVLAR™), spider silk, carbon fiber, and/or other suitable material.

In some embodiments, the blast layer 102 may further include cord members 108 to hold portions of the blast material 104, such as the upper portion 104A and lower portion 104B, in their relative positions during an explosion within the containment vessel 100. In the illustrated example, the cord members 108 can be coupled to, and extend between both the upper 104A and lower portions of the blast material 104A, 104B to keep each portion in substantially the same position relative to the other portion during an explosion within the containment vessel 100. In at least one embodiment, the cord members 108 are configured with relatively high tensile strength materials. By way of example and not limitation, the cord members 108 may be formed from metallic rods, steel aircraft cables, VECTRAN™ rope, nylon webbing, and/or other suitable material.

In one or more embodiments, the containment vessel 100 may include a non-porous layer 110. In at least some examples, the non-porous layer 110 may be shaped with a larger total enclosed volume compared to the blast layer 102 to facilitate expansion. For example, if a device surrounded by the containment vessel 100 were to emit a threat (e.g., chemical or biological agent) in the form of an aerosolized or pressurized gas or a vapor material, the non-porous layer 110 can be configured with sufficient volume to contain the gas expansion that may occur if the threat were emitted by the enclosed device. By way of example and not limitation, the non-porous layer 110 may be formed from a polypropylene sheet, polyethylene sheet, latex sheet, and/or other suitable material.

In one or more embodiments, the containment vessel 100 may include a conductive layer (not shown) configured to form a faraday cage to block electromagnetic or RF signals from passing to or from an enclosed device. In this manner, the containment vessel 100 can inhibit or completely block remote detonation/deployment of the enclosed device, as well as other signals transmitted to the enclosed device and/or from the enclosed device. In one or more examples, the conductive layer may be formed on another layer, such as the non-porous layer 110. For instance, one or more other layers may be metalized in a manner to form a faraday cage. In other embodiments, the conductive layer may be its own discrete layer of the containment vessel 100. By way of example and not limitation, the conductive layer may be formed from a metalized polypropylene, a carbon-loaded poly, a metal mesh, and/or other suitable material.

The containment vessel 100 may further include at least one expansion member coupled to the one or more containment layers. The expansion member is configured to apply a force to the one or more containment layers sufficient to expand a perimeter of the one or more containment layers laterally outward to open the containment vessel 100. For example, one or more embodiments of an expansion member may include a rod in a hoop shape coupled to the one or more containment layers at or near a perimeter. For instance, as shown in FIG. 1, a respective flexible rod 112 is coupled to each of the containment layers at or near the perimeter thereof. Each flexible rod 112 may be bent from a straight longitudinal rod into the circular or hoop configuration shown in FIG. 1, resulting in a spring-like force as the material in the rod 112 tries to return from the bent configuration to the straight configuration. As a result, a force is applied to the one or more containment layers, which pulls the perimeter of the one or more containment layers laterally outward. In this manner, a flexible rod 112 can expand or open the one or more containment layers for placement over a target device.

To store such a containment vessel 100 including an expansion member so configured with a rod 112 coupled at or near a perimeter of the one or more containment layers, the rod 112 may be folded down into a storage configuration as is commonly understood with hoop-shaped rods. For instance, in one example the hoop-shaped rod 112 may be twisted to form a shape of the number '8', and the two smaller circles formed by twisted rod 112 can be folded onto each other at the position where the hoop crosses over itself in the '8'-shaped configuration. In such an example, the folded rod 112 is reduced in size. Another example for folding a similar hoop is described in U.S. Pat. No. 5,056,172, the entire disclosure of which is incorporated herein by this reference.

In another embodiment of an expansion member, a plurality of rods may be coupled to the one or more containment layers to extend over a surface of the containment layer(s). For example, as shown in FIG. 1, the cord members 108 may be configured as rods that extend longitudinally in a generally straight configuration. Such cord members 108 are described above as being a part of a containment layer configured as a blast layer 102. However, cord members 108 that are provided in a rod configuration employed as an expansion member may be utilized with any configuration of a containment layer, and not just with a blast layer. The spring-like force from such cord members 108 with a rod configuration can expand the perimeter of the one or more containment layers laterally outward. In this manner, the rods expand or open the one or more containment layers for placement over a target device.

In some embodiments, the containment vessel 100 can be deployed by positioning the opened containment vessel 100 as shown in FIG. 1 onto a device to be enclosed. The perimeter of the one or more containment layers can then be cinched down so that the device is at least substantially enclosed within the volume of the containment vessel 100 after the perimeter is tightened. In some embodiments, an opened containment vessel 100 can be positioned on a device by one or more users. For example, a bomb squad or other person or group of persons may place the opened containment vessel 100 either manually or by robot onto a threat, such as an unaccompanied bag left at an airport.

Figure 3:
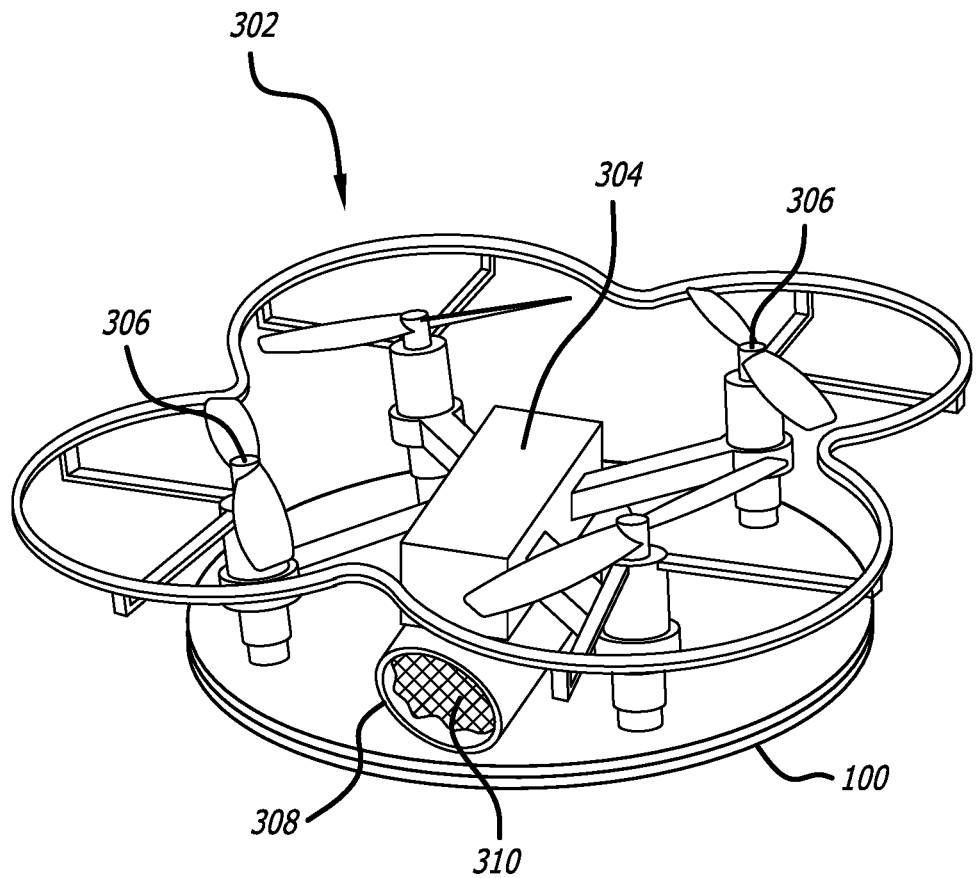
FIG. 3 is an isometric diagram of an unmanned aerial vehicle (UAV) including a containment vessel according to at least one example of the disclosure.

One or more aspects of the present disclosure include UAVs carrying a containment vessel 100. FIG. 3 is an example of a UAV 302 configured to carry a deployable containment vessel 100. Generally speaking, the UAV 302 includes an airframe 304 and a propulsion system coupled to the airframe 304. The propulsion system may generally include a plurality of propellers 306 coupled to motors. In some embodiments, the UAV 302 may further include a netting system 308 coupled to the airframe 304. The netting system 308 may generally include a container with a propellant (e.g., gas generant, compressed air, spring, electromagnet) and a net 310 disposed therein. The netting system 308 may be configured to deploy the net 310 toward a target. The net 310 can be coupled to a tether 402 (see FIG. 4), which tether 402 can also be coupled to the airframe 304. As shown in FIG. 3, the containment vessel 100 may be coupled to the UAV 302. In such embodiments, the containment vessel 100 can be stored in a folded storage configuration, such as the folded storage configuration noted above.

In operation, the UAV 302 may deploy a containment vessel 100 to enclose an object, such as a target UAV that is flying in an unauthorized airspace or a ground-based object that may be determined to be a potential threat (e.g., a bag left unattended at an airport). In the example shown in FIG. 4, which includes FIGS. 4A and 4B, the UAV 302 utilizes the containment vessel 100 with an airborne target UAV 404. The target UAV 404 may initially be captured within the net 310 or other similar capture device. For example, the UAV 302 may deploy the net 310 to capture the target UAV 404. When the target UAV 404 is captured within the net 310, the UAV 302 can deploy the containment vessel 100. In the depicted example of FIG. 4A, the containment vessel 100 is in a folded or storage mode when coupled to the UAV 302. When the containment vessel 100 is deployed from such a folded storage configuration to an open configuration, the one or more expansion members (e.g., rod 112, cord members 108) can expand the perimeter of the one or more containment layers open to the fully open configuration.

Figure 4A:
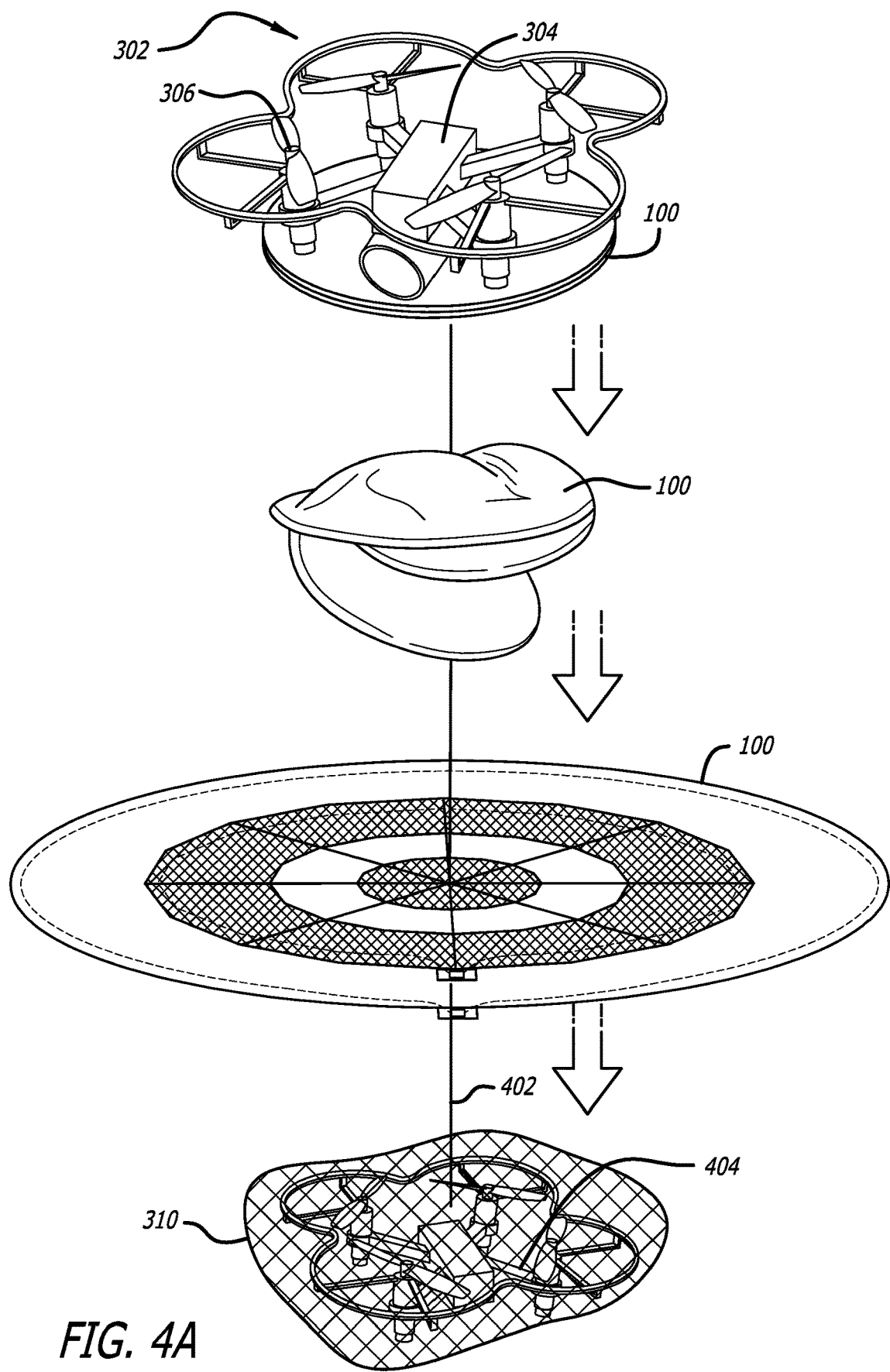
FIGS. 4A and 4B illustrate an unmanned aerial vehicle (UAV) deploying a containment vessel to enclose a target UAV therein according to at least one example of the disclosure.

In the example of FIG. 4A, the containment vessel 100 can include an aperture through which the tether 402 passes. In this manner, the tether 402 can act as a guide for the containment vessel 100 to direct the containment vessel 100 to the target UAV 404.

Figure 4B:
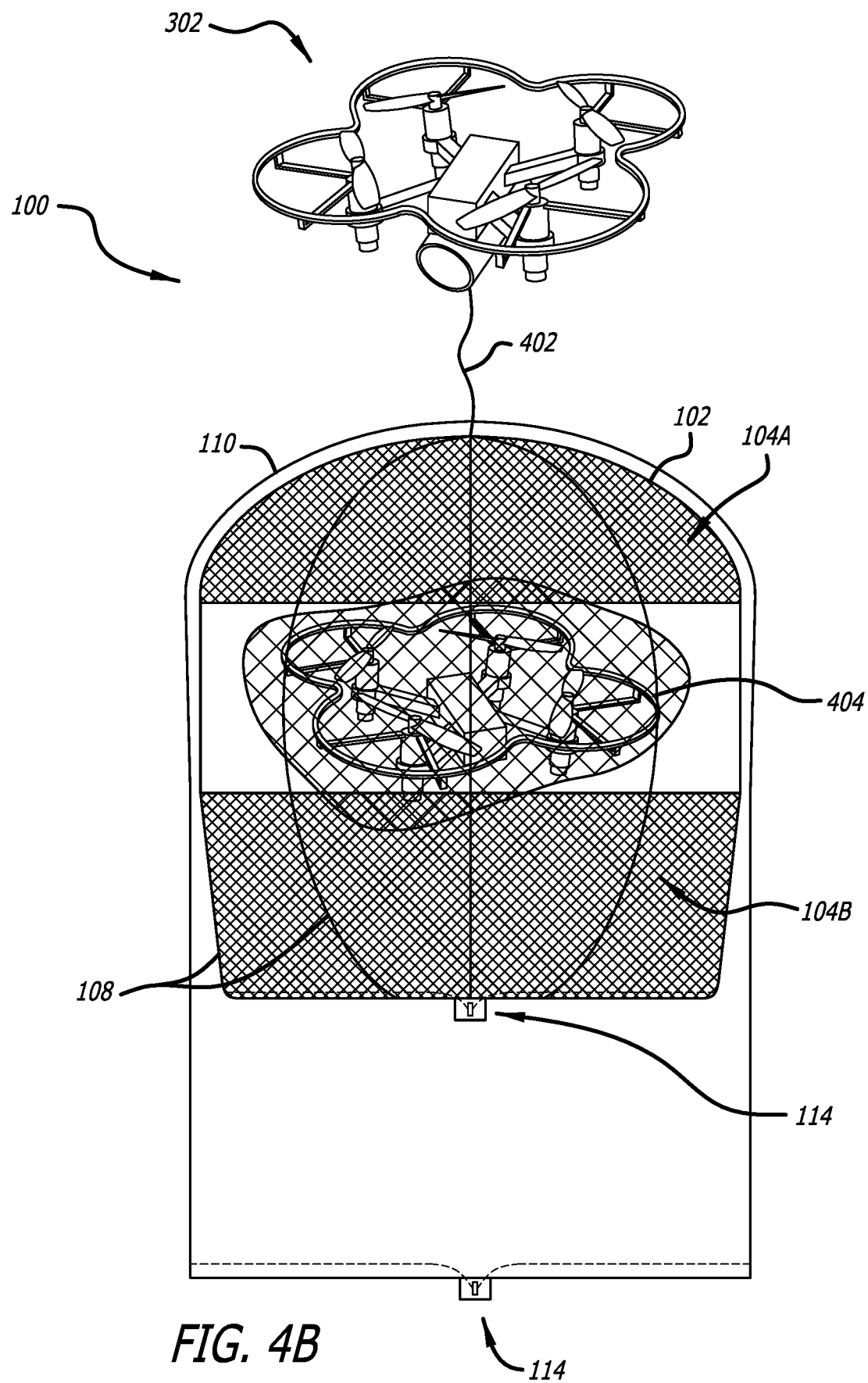
Figure 5:
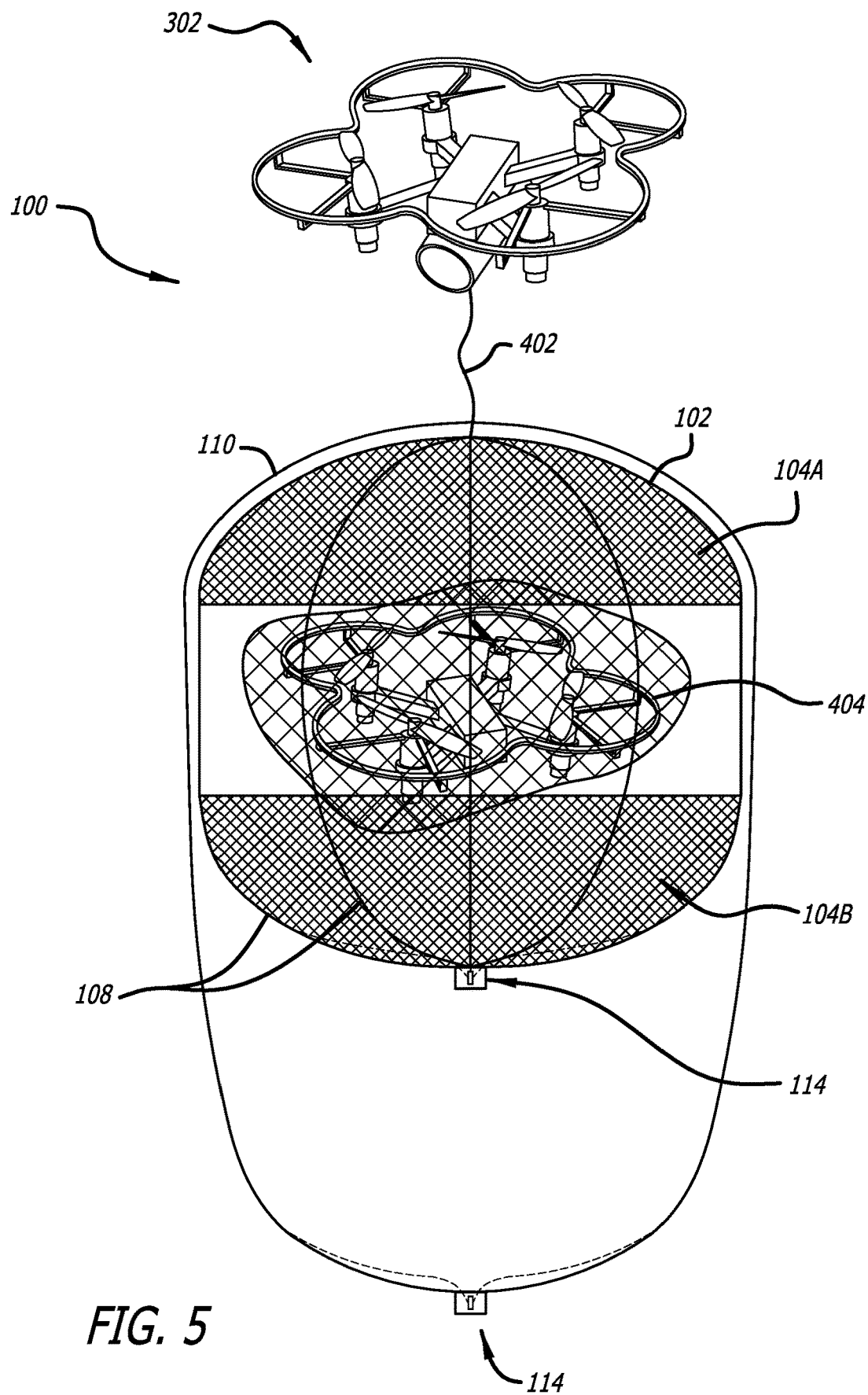
FIG. 5 is a diagram illustrating the successful enclosure of a target UAV within a containment vessel according to at least one example of the disclosure.

When the containment vessel 100 reaches the target UAV 404, the perimeter of the one or more containment layers of the containment vessel 100 can drop down over the target UAV 404, as shown in FIG. 4B, before being tightened down at a cinch point, such as the respective cinch points that are located adjacent to respective cinching mechanisms 114. In some embodiments with more than one containment layer, a single cinching mechanism 114 may be utilized to tighten all of the containment layers. For example, in the embodiment in FIG. 2 with two layers, both layers could be tightened down to the single cinch point utilizing just a single cinching mechanism 114. In other embodiments with more than one containment layer, each containment layer may employ its own respective cinch point as shown in FIGS. 2, 4B, and 5, with each containment layer utilizing its own respective cinching mechanism 114 to tighten a respective containment layer independently from other containment layers.

To facilitate the cinching of the one or more containment layers, the containment vessel 100 can include a closure system. As shown in FIG. 1, the closure system may include a cinching mechanism 114 configured to tighten one or more containment layers at the respective cinch point. The closure system can tighten down the perimeter of one or more containment layers to enclose the containment vessel 100 around an object. In one or more embodiments, a cord or rod can be coupled to a containment layer at or near its perimeter, as depicted by respective elements 112 that can represent a cord or rod coupled to each of the blast layer 102 and the non-porous layer 110 in one or more embodiments. A cinching mechanism 114 can ratchet, wind, reel or otherwise cinch one end of the cord or rod relative to the other end of the cord or rod to decrease the length of the cord or rod that remains in contact with the containment layer of the containment vessel 100, essentially tightening the perimeter of the containment layer together.

In some embodiments, a sealing compound may be included in a container at or near the cinch location and/or a hole for the tether 402 when present. In such embodiments, the container may dispense the sealant around the hole formed at the cinch point when the perimeter of the containment layer is tightened down to provide an air-tight seal for containment of materials inside the containment vessel 100. According to at least one example, a sealing compound may be contained in an ampule located on the containment vessel 100 so that the ampule is crushed or opened when the perimeter of the containment layer is cinched, releasing the sealing compound to fill any gaps at the cinch point and forming a gas-tight seal at the closure.

In some embodiments, the component 112 (e.g., cord, rod) that is cinched by the cinching mechanism may be sufficiently weighted to pull the perimeter of the containment layer down around an object to be enclosed within the containment vessel 100. In some embodiments, weights may be utilized in addition to the component 112 (e.g., cord, rod) that is cinched by the cinching mechanism to weigh down the perimeter of the one or more containment layers.

FIG. 5 shows an example where the target UAV 404 has been enclosed within the containment vessel 100. In this example, detonation of an explosive carried by the target UAV 404 can be contained by the blast layer 102, protecting persons and/or objects above and below the target UAV 404, while directing pressure and shrapnel to vent laterally. In this same example, a chemical or biological agent released by the target UAV 404 can be contained by the non-porous layer 110, and any gas expansion inside the containment vessel 100 is handled by the extra volume associated with the non-porous layer 110. In this same example, a conductive layer can inhibit communication between the target UAV 404 and another device and/or an operator.

Figure 6:
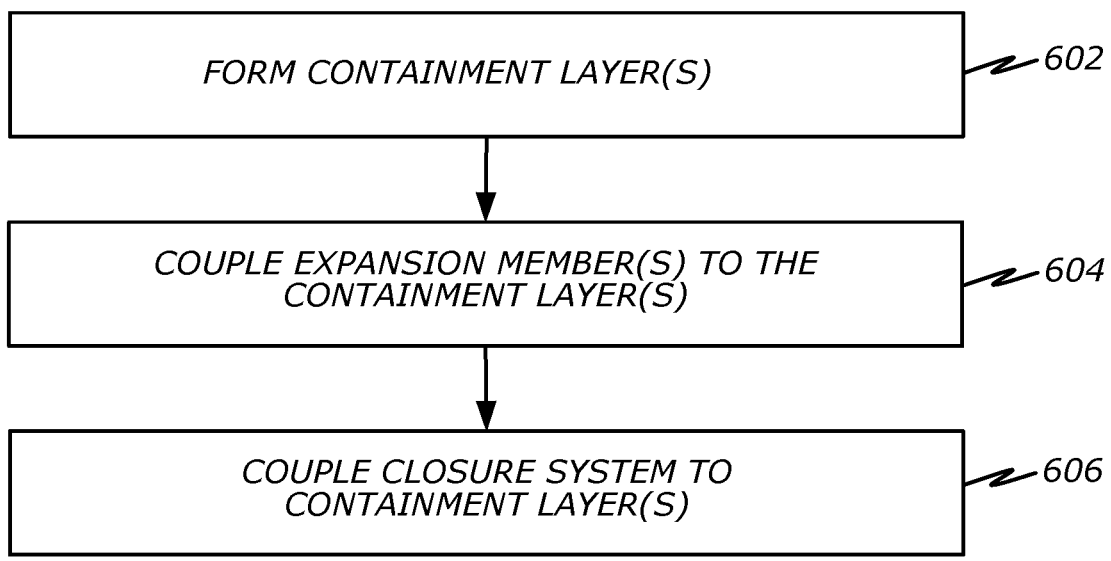
FIG. 6 is a flow diagram depicting an example of a method of making a containment vessel according to one or more implementations of the present disclosure.

Additional aspects of the present disclosure relate to methods of making a containment vessel. FIG. 6 is a flow diagram depicting an example of a method of making a containment vessel according to one or more implementations of the present disclosure. As shown, one or more containment layers may be formed at 602. As set forth above, a containment layer is generally formed to address one or more specific types of threats. For example, forming one or more containment layers may include forming one or more of a blast layer, a non-porous layer, a conductive layer, and/or other containment layer(s). Formation of a blast layer, a non-porous layer, and/or a conductive layer may be performed to include one or more of the characteristics described above for each type of containment layer.

At 604, one or more expansion members may be coupled to the one or more containment layers. As noted herein above, the expansion member(s) may be generally configured to apply a force to the one or more containment layers sufficient to expand a perimeter of the one or more containment layers laterally outward. According to at least one example, a rod may be coupled to the perimeter of the one or more containment layers in a hoop shape, as described herein. In one or more other examples, a plurality of rods may be coupled across a surface of the one or more containment layers, as described herein.

At 606, a closure system may be coupled to the one or more containment layers. As noted herein, the closure system is configured to cinch the perimeter of the one or more containment layers closed around a target object. The closure system may include a cinch component (e.g., cord, rod) coupled to a containment layer proximate its perimeter. The closure system may further include a cinching mechanism coupled to the cinch component to cinch the cinch component when the cinching mechanism is activated. In one or more implementations, a sealant container with a sealant may also be provided and positioned in a location to facilitate disposing the sealant into a cinch point for filling an opening formed where the perimeter of the containment layer is tightened down by the closure system.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A blast and dispersion mitigation device, comprising:
   at least one containment layer;
   at least one expansion member comprising a plurality of rods coupled to the at least one containment layer, each rod of the plurality of rods extending from a location proximate a perimeter of the at least one containment layer over a surface of the at least one containment layer toward a location proximate a center of the at least one containment layer, the at least one expansion member applying a force to the at least one containment layer sufficient to expand a perimeter of the at least one containment layer laterally outward when deployed; and
   a closure system configured to cinch the perimeter of the at least one containment layer around a target object without manual intervention.

2. The device of claim 1, wherein the at least one containment layer comprises at least one containment layer selected from a group of containment layers comprising:
   a blast layer;
   a non-porous layer; and
   a conductive layer.

3. The device of claim 2, wherein the blast layer comprises:
   at least one portion of blast material; and
   at least one exhaust section.

4. The device of claim 3, wherein the blast layer comprises:
   a first portion of blast material;
   a second portion of blast material;

an exhaust section located between the first portion of blast material and the second portion of blast material; and at least one cord member coupled to the first portion of blast material and the second portion of blast material, the at least one cord member extending between the first portion of blast material and the second portion of blast material, and extending across the exhaust section.

5. The device of claim 1, wherein the closure system includes a cinching mechanism that cinches a component coupled proximate the perimeter of the at least one containment layer.

6. The device of claim 5, wherein the cinching mechanism cinches one of a rod or a cord.

7. A method of making a blast and dispersion mitigation device, comprising:

obtaining at least one containment layer;

coupling a plurality of rods to the at least one containment layer, wherein each rod of the plurality of rods extends from a location proximate a perimeter of the at least one containment layer over a surface of the at least one containment layer toward a location proximate a center of the at least one containment layer, wherein the at least one expansion member applies a force sufficient to expand a perimeter of the at least one containment layer laterally outward when deployed; and coupling a closure system to the at least one containment layer to cinch the perimeter of the at least one containment layer when activated.

8. The method of claim 7, wherein forming the at least one containment layer comprises forming at least one of a blast layer, a non-porous layer, or a conductive layer.

9. The method of claim 7, wherein forming the at least one containment layer comprises:

forming a blast layer comprising at least one portion of blast material and at least one exhaust section.

10. The method of claim 7, wherein the coupling the closure system comprises:

coupling a cinch component proximate the perimeter of the at least one containment layer; and coupling a cinching mechanism to the cinch component to cinch the cinch component when the cinching mechanism is activated.

11. The method of claim 7, wherein the coupling the closure system comprises:

providing a sealant container with a sealant, the sealant container positioned to dispense a sealant into an opening formed at a cinch point where the perimeter of the containment layer is tightened down by the closure system.

* * * * *